(12) United States Patent
Farcy et al.

(10) Patent No.: US 6,813,033 B2
(45) Date of Patent: Nov. 2, 2004

(54) OPTICAL METHOD OF READING THE SHAPE OF A PROFILE AND APPLICATION THEREOF TO READING THE INSIDE EDGE OF A SPECTACLE FRAME RIM

(75) Inventors: René Farcy, Verrieres le Buisson (FR); Florent Guirriec, Loperec (FR); Emmanuel Almeras, Paris (FR); Laurent Guillermin, Paris (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 225 days.

(21) Appl. No.: 09/968,019

(22) Filed: Oct. 2, 2001

(65) Prior Publication Data

US 2002/0041357 A1 Apr. 11, 2002

(30) Foreign Application Priority Data

Oct. 2, 2000 (FR) .............................................. 00 12520

(51) Int. Cl.[7] .......................... G01B 11/24; G01B 26/08; A61B 3/10
(52) U.S. Cl. ........................... 356/601; 33/200; 359/201
(58) Field of Search .................. 33/200, 507; 356/601, 356/608, 607, 613, 606; 351/42, 178; 359/201, 202

(56) References Cited

U.S. PATENT DOCUMENTS 3,187,185 A    6/1965  Milnes 5,298,974 A  *  3/1994  Chandley ................... 356/613
5,307,150 A  *  4/1994  Lecerf et al. ............... 356/601
6,421,451 B1 *  7/2002  Shiratsuchi et al. ........ 382/101

FOREIGN PATENT DOCUMENTS

| FR | 1312164 | 3/1963 | ............ B24B/9/14 |
| FR | 2375578 | 7/1978 | ........... G02C/13/00 |
| FR | 2398000 | 2/1979 | ........... G01B/11/24 |
| FR | 2538538 | 6/1984 | ............ G02C/5/00 |
| GB | 1566659 | 5/1980 | |
| GB | 2133173 | 7/1984 | ............ G01B/9/08 |

\* cited by examiner

Primary Examiner—Alan Mathews
(74) Attorney, Agent, or Firm—Young & Thompson

(57) ABSTRACT

An optical non-contact method of reading the three-dimensional shape of a profile in accordance with the luminous section principle consists of scanning the profile with a plane light beam intersecting the profile transversely, simultaneously reading the trace of the plane light beam on the profile by means of an optical receiver having an optical pointing axis at a constant non-zero pointing angle to the light beam at a series of positions along the profile, and deducing the three-dimensional shape of the profile from the readings effected at these various positions. On each reading, the light beam whose trace on the profile is read by the optical receiver is chosen from a plurality of predefined light beams which can be activated alternately. The non-contact optical reading method is particularly suitable for reading the three-dimensional shape of the inside edge of a spectacle frame rim, known as the bezel. A specific device is used to implement the method in this particular application.

35 Claims, 3 Drawing Sheets

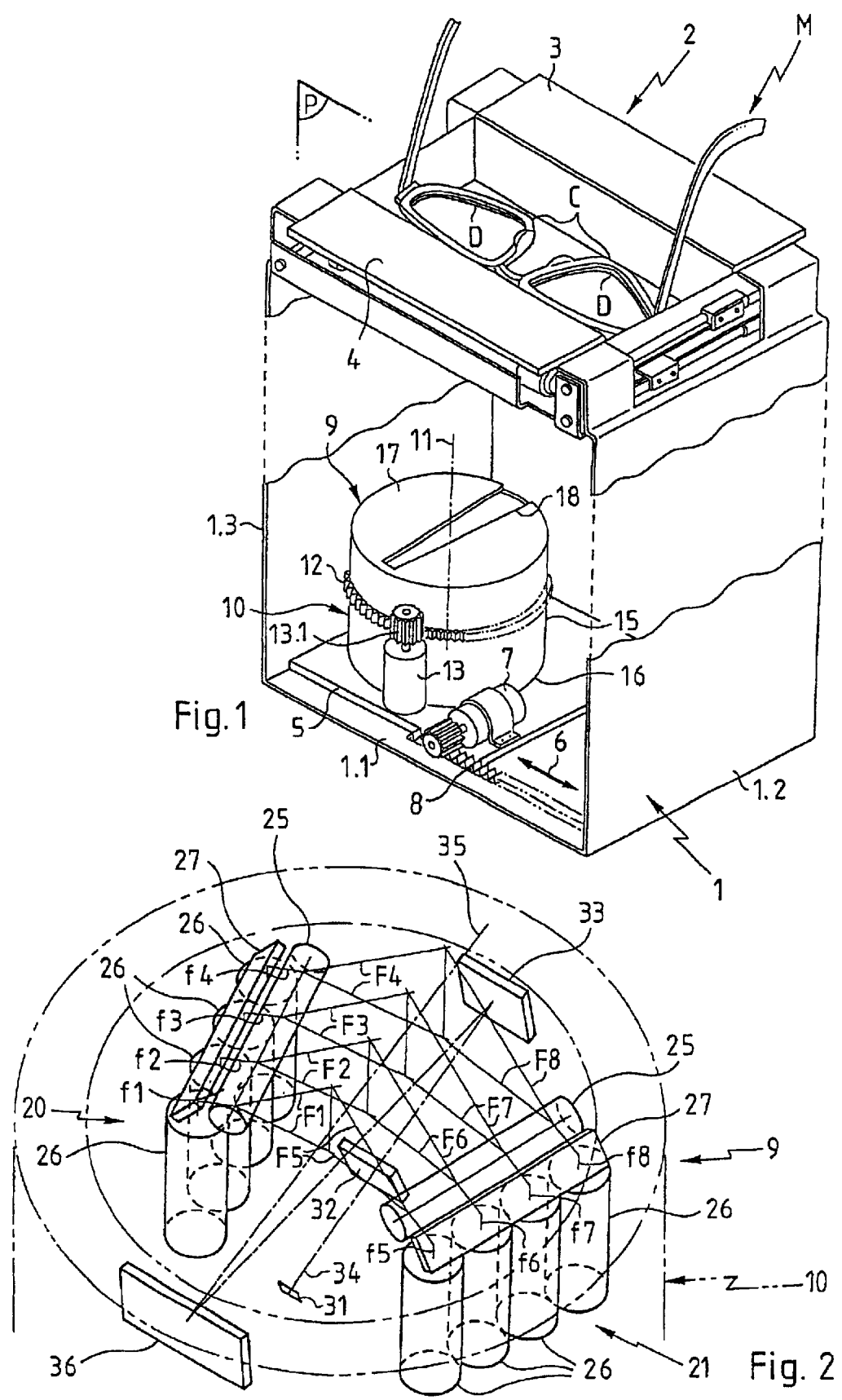

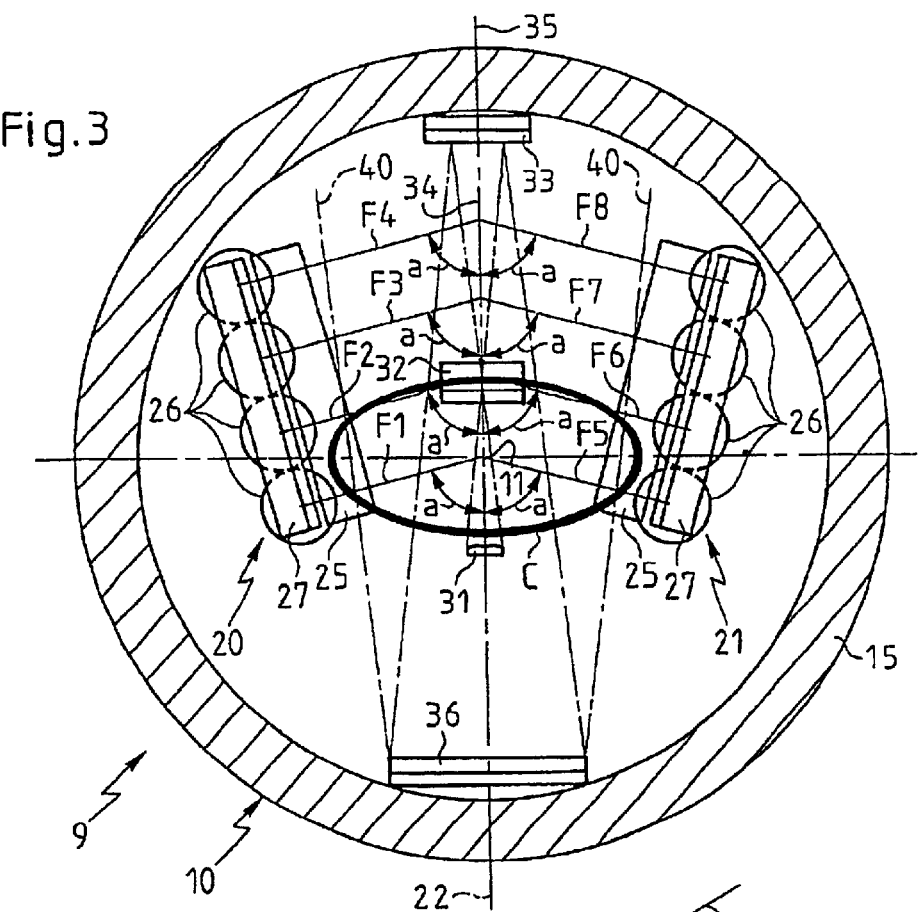
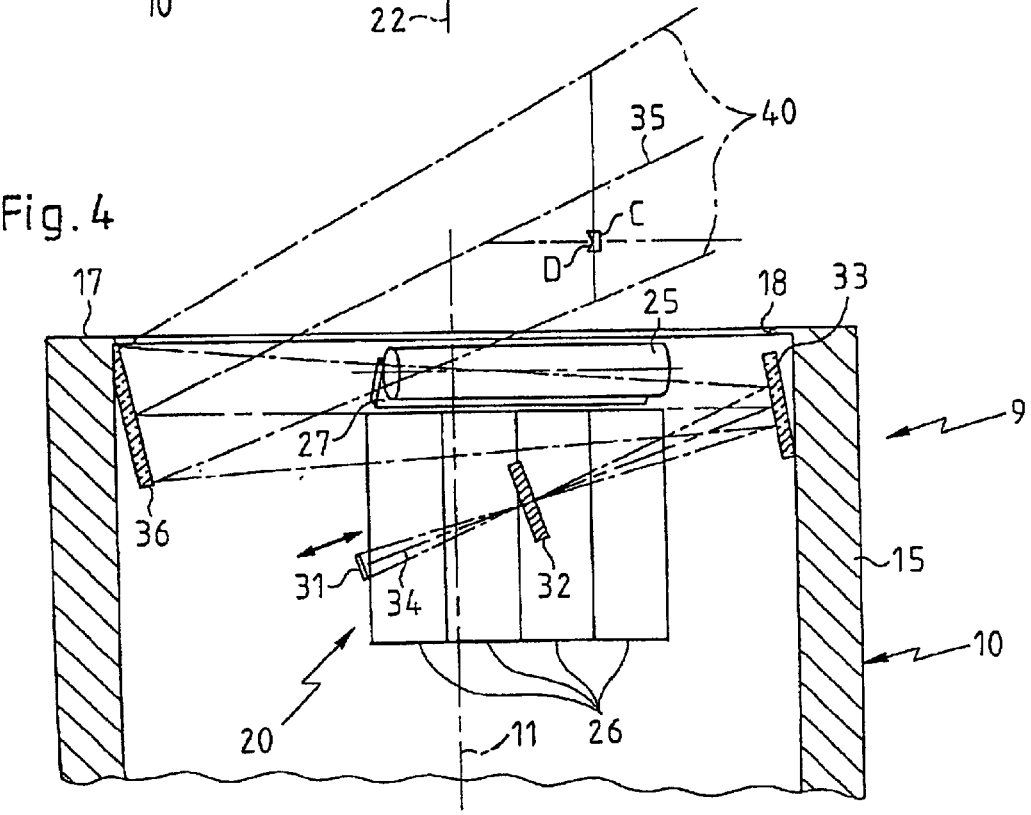

OPTICAL METHOD OF READING THE SHAPE OF A PROFILE AND APPLICATION THEREOF TO READING THE INSIDE EDGE OF A SPECTACLE FRAME RIM

BACKGROUND OF THE INVENTION

1. Field of the Invention

The invention relates to an optical non-contact method employing the luminous section principle to read the three-dimensional shape of a profile. It finds one particularly pertinent application in reading the shape of the inside edge of a spectacle frame rim, known as the bezel. The invention also relates to a device for implementing the method when applied to reading a spectacle frame bezel.

2. Description of the Prior Art

During the fabrication of a pair of spectacles, in order to be able to mount the lenses in the frame, it is necessary to adapt the outside edge of each lens to fit the inside edge of the corresponding rim of the frame, usually called the bezel. A numerically controlled grinding machine is usually employed for this purpose and adapts the outside edge of each lens to the shape of the bezel into which it must be crimped.

To perform numerically controlled grinding in this way, it is necessary to have a numerical model of the three-dimensional shape of the bezel concerned.

At present, the three-dimensional shape of a bezel is acquired by means of a contact-type measuring device in which a feeler associated with a measuring head rotating about the central axis of the frame rim comes into physical contact with the bezel and slides along the whole of its periphery. However, this contact-type measurement is not entirely satisfactory, for two main reasons. First of all, the feeler, winch is urged at all times against the bezel, can in some cases cause deformation of the frame rim, falsifying the measurements. Secondly, the mechanical system guiding the feeler cannot achieve complete acquisition of the profile of the bezel over the whole of its perimeter in an acceptable time, i.e. in less than one minute. This precision mechanical system is also relatively costly, although it can only provide an acceptable level of accuracy with sufficient radial movement of the feeler. The resulting fabrication and maintenance problems are detrimental to cost.

To remedy these drawbacks, a number of non-contact optical methods and devices have previously been proposed for reading the three-dimensional shape of the bezel.

Thus the documents FR 2 679 997 and FR 2 713 758 propose a non-contact optical method of reading the shape of a spectacle frame rim bezel using a narrow light beam (rectilinear coherent laser beam) to illuminate certain characteristic points of the bezel and an optical sensor with a matrix of CCD photosensors to register the impact of the beam at each of those points. The spatial coordinates of each of the points illuminated in this way are then computed by triangulation from the position, as acquired by the sensor, of the image of the point of impact of the beam on the frame and the respective spatial configurations of the laser beam and the sensor. To enable illumination and reading of points over the full height of the bezel, the laser beam, to be more precise its source, can move along the axis of the rim concerned of the frame, i.e. in practice vertically.

The documents WO 98/45664 and WO 00/03839 propose a similar type of reading method in which the light beam, instead of taking the form of a rectilinear narrow beam, diverges in a plane so that it intersects the bezel transversely. In this method, known as the luminous section method, the sensor receives the image of the trace (or luminous section) of the plane light beam on the bezel. Thus each optical reading does not relate to only one point on the bezel, but to a complete cross section of the bezel.

The above luminous section method is described in detail in the following document:

"A perspective, on range finding techniques for computer vision", R. A. Jarvis, IEEE transactions on pattern analysis and machine intelligence, Vol. PAMI-5, N° 2 March 1983.

It essentially entails scanning the profile with a plane light beam intersecting the profile transversely and simultaneously reading the trace of the plane light beam at a series of positions along the profile using optical receiver means having an optical pointing axis at a constant non-zero pointing angle to the light beam. Finally, a programmed computer deduces the three-dimensional shape of the profile from the readings effected at the various positions.

The documents WO 98/45664 and WO 00/03839 propose non-contact optical devices for reading the three-dimensional shape of the inside edge, referred to as the bezel, of a spectacle frame rim, which devices implement the above method and include a support for the frame rim and a read head which rotates relative to the support about a rotation axis and with which is associated a sensor responsive to its angular position relative to the support, the read head including emitter means adapted to project a plane light beam intersecting the bezel transversely and optical receiver means adapted, regardless of the angular position of the read head relative to the frame support, to read the trace of the plane light beam on the bezel along an optical pointing axis at a constant non-zero pointing angle to the light beam.

It is therefore clear that, compared to the method of reading points previously cited, the above luminous section method and the device for implementing it have the advantage of reading the complete section of the bezel over its full height each time that the optical receiver means capture an image and without it being necessary to provide for each angular position of the read head any vertical displacement of the laser beam to scan of the section concerned of the bezel transversely.

However, whichever type of light beam is used (rectilinear narrow beam or plane divergent beam), several as yet unsolved problems impede practical use of the above non-contact optical reading methods.

The first problem results from the diverse sizes of spectacle frames, which impose a minimum depth of field of the order of 4 cm. The constraints for satisfactory crimping of the lens into the bezel, in particular in metal frames, impose a relatively high level of accuracy for grinding the outside edge of the lens in corresponding relationship to the shape of the bezel. The resulting accuracy required in reading the shape of the bezel is of the order of one hundredth of a millimeter.

Because these two requirements, relating on the one hand to the depth of field and on the other hand to the accuracy of the measurement, are mutually contradictory, it is not possible at present to satisfy them with components available off the shelf. A compromise consisting of a depth of field of 4 cm for an accuracy of 0.01 mm imposes the use of a sensor providing 4000 measuring points, i.e. a CCD camera with 2000×2000 pixels and a resolution of 0.5 pixel. This resolution is difficult to achieve because a large area camera implies a wide field, which constitutes a source of optical aberrations, especially at the edges, and this impedes obtaining a resolution of less than one pixel unless relatively costly and bulky high-performance optics are used. Furthermore, it is not easy to generate a divergent plane light beam that is sufficiently thin to be contained within a depth of 4 cm, which requires the use of relatively costly and bulky precision optics.

Given the above constraints, the only practical solution to the problem of implementing the above reading method with sufficient accuracy is to control the combination of the laser beam and the sensor mechanically to maintain it at a very small distance from the bezel, in order to restrict the depth of field required of the sensor. However, this requires a tracking mechanism whose complexity and cost are added to those of the optical reader device.

Optical methods of reading a bezel of a spectacle frame run into a second difficulty. Spectacle frames can be made with very different shapes and from diverse materials having their own optical properties, in particular with regard to reflection, absorption, diffusion and back-scattering. Thus an optical reading method can be validated only on condition that it proves to be effective for all types of frame, in particular those having rims of circular, oval or rectangular shape and made from metal, opaque plastics material, multicolored plastics material or transparent or translucent plastics material, with or without metal inserts. Because of this diversity of shapes and materials, reception by the optical sensor of the image of the trace of the laser beam on the bezel can be rendered impossible by certain optical phenomena depending on the illumination and image capture configuration. In particular, it is necessary to envisage the following difficulties:

- a specific point or area of excessively intense reflection for a given reading illumination angle,
- the presence of metal inserts in a transparent or translucent plastics material frame rim causing unwanted reflections masking the trace of the plane light beam on the bezel or making it unusable,
- an angle of incidence of the light beam producing too much or too little reflection to be usable by the optical sensor, depending on the material from which the frame concerned is made, and
- a pronounced oblong shape of the rim of the frame preventing illumination of certain sectors of the bezel at a given angle, the light beam impinging on the outside of the rim of the frame.

In the above context, one aim of the present invention is to provide an optical non-contact method of reading the three-dimensional shape of a profile, such as the bezel of a spectacle frame rim, avoiding the compromise between resolution and depth of field as much as possible by "increasing" the depth of field, whilst retaining a satisfactory resolution, without it being necessary to use complex and costly optical reader means.

Another object of the invention is to minimize luminous signal losses, i.e. to render the image of the trace of the laser beam on the bezel usable by the optical receiver means for the greatest possible variety of situations and types of frame, in particular those previously referred to.

SUMMARY OF THE INVENTION

With a view to achieving at least one of the above two objects, the invention proposes an optical non-contact method of reading the three-dimensional shape of any profile in accordance with the luminous section principle, the method consisting of:

scanning the profile with a plane light beam intersecting the profile transversely, simultaneously reading the trace of the plane light beam on the profile by means of optical receiver means having an optical pointing axis at a constant non-zero pointing angle to the light beam at a series of positions along the profile, and deducing the three-dimensional shape of the profile from the readings effected at these various positions, in which method, on each reading, the light beam whose trace on the profile is read by the optical receiver means is chosen from a plurality of predefined light beams which can be activated alternately.

To be more specific, the above method can advantageously be applied to the situation more particularly referred to hereinabove of reading the shape of the inside edge of a spectacle frame rim, referred to as the bezel.

There is also proposed, for implementing the above method, an optical non-contact device for reading the three-dimensional shape of the inside edge, referred to as the bezel, of a rim of a spectacle frame, the device including a support for the frame rim and a read head rotatable relative to the support about a rotation axis and associated with a sensor responsive to its angular position relative to the support, the read head including emitter means adapted to project a plane light beam intersecting the bezel transversely and optical receiver means adapted, regardless of the angular position of the read head relative to the frame support, to read the trace of the plane light beam on the bezel along an optical pointing axis at a constant non-zero pointing angle to the light beam, in which device the emitter means are adapted to project at least two separate light beams.

Accordingly, to capture each image, it is possible to choose, from among the plurality of light beams available, the one whose trace on the profile is the most propitious to accurate reading by the optical receiver means along their optical pointing axis. This choice of the most suitable light beam for the configuration encountered can be directed to achieving either or both of the two objects previously cited.

In a first aspect, the choice offered by the emitter means between a plurality of light beams can generate an artificial "increase" in the depth of field of the optical receiver means, with no loss of accuracy. As previously mentioned, to preserve good reading accuracy without using complex, bulky and costly optical means, it is necessary to accept a restricted depth of field of the optical receiver means. It follows that with a single light beam, the trace of the beam could not fail to leave the field of the optical receiver means in various areas of the profile, unless the profile were tracked at a constant distance by the optical receiver means. According to the invention, this problem relating to the necessary narrowness of the field of the optical receiver means is compensated by the possibility of illuminating the profile with another light beam, offset relative to its inoperative counterpart, and thereby defining another range of reception in which its trace on the profile (bezel) is totally within the field of the optical receiver means. In other words, the various light beams define, in relation with the depth of field of the optical receiver means, different reading ranges which, on being juxtaposed, are additive and thereby define an overall reading range that is much more extensive than only one of those ranges taken in isolation. When scanning the profile, the light beams are activated alternately so that the trace of the active light beam is in the field of the optical receiver means. This choice between a plurality of beams offered by the emitter means thereby artificially demultiplies the depth of field, and it is therefore possible to use high-precision optical receiver means with a small depth of field, with no costly optical system that is difficult to implement.

In a second aspect, the choice between a plurality of light beams offered by the emitter means overcomes the reception difficulties resulting from the diverse shapes and materials of the frames (or other profiles). To capture each image it is possible to change the active light beam as soon as reading becomes impossible or inaccurate with the light beam that is initially active. Clearly, the problems previously cited, relating to the difficulty or impossibility of receiving images or even of illuminating particular areas of the profile, arise only in a relatively precise geometrical configuration of the light beam and the optical receiver means relative to the area concerned of the profile. Consequently, the reception or illumination problems that arise with a particular light beam will generally not arise with another light beam having a different geometrical configuration. This is why alternating between a plurality of light beams overcomes the reception or illumination difficulty in most cases.

To improve reading accuracy, it is preferable to have a pointing angle greater than 45°. In practice, a pointing angle of approximately 70° is a good compromise for highly accurate and effective reading in most configurations.

The invention provides a number of additional advantageous features contributing to achieving either or both of the two technical effects developed hereinabove.

In particular, to increase the depth of field of the optical receiver means artificially, the plurality of light beams can include at least one series of at least two juxtaposed and substantially parallel light beams. In practice, a number of juxtaposed light beams from three to eight in the or each series is satisfactory for reading most frame bezels.

Accordingly, when scanning the profile, if the depth of field of the optical receiver means is reduced to the benefit of reading accuracy, the trace of the active light beam may escape from the receive field. In this case, it is sufficient to deactivate that light beam and to activate the adjacent light beam, which, because it is offset relative to initial beam, covers a receive range offset relative to that covered by the initially active beam and therefore illuminates the profile (bezel) along a trace which is within the receive field of the optical receiver means. Accordingly, depending on the distance between the area concerned of the profile (bezel) and optical receiver means (to be more precise the rotation axis of the read head), the choice can be made to activate the parallel juxtaposed light beam covering the receive range corresponding to that distance and whose trace is in the receive field of the optical receiver means. As previously explained, this artificially increases the receive depth of field by creating between the parallel juxtaposed light beams reading ranges corresponding to a particular range of the distance of the profile from the optical receiver means. In other words, the depth of field needed to read a profile in an overall range is divided by the number of parallel juxtaposed light beams, the necessary overall receive range being divided into the same number of small reading ranges, respectively associated with various parallel juxtaposed beams.

Instead of, or in combination with, the plurality of juxtaposed light beams, to overcome the reception problems resulting from the diverse shapes and materials of the frames in particular areas of the bezel of the frame rim, or more generally of the profile concerned, the plurality of light beams can include at least two light beams with an angle between them greater than 20°.

Accordingly, a given area of the profile (bezel) can be illuminated alternately by one or the other of these two beams at two different angles of incidence. Then, if the illumination of a given area of the profile by one of the light beams cannot produce a satisfactory reading, for any of the reasons previously explained, that beam is deactivated in favor of an angularly offset beam, to illuminate the area concerned of the profile at another angle with a very high probability of producing a satisfactory reading, or at least a better reading than the first beam. Similarly, if, in a particular area of the profile, to be more specific in a particular area of the bezel of a frame rim, the light beam is reflected by a metal insert buried in a translucent plastics material, causing abnormal reflection of the beam, preventing accurate reading of its trace, it is again sufficient to deactivate the beam encountering the metal insert and activate the other, angularly offset beam. The latter, illuminating the profile at a different angle, will not encounter the metal insert and the unwanted reflection from that insert will therefore be eliminated, so that a reading can be obtained under the normal conditions.

In one advantageous configuration the plurality of light beams includes at least one pair of light beams symmetrical to each other with respect to a median reading plane containing the optical pointing axis. Accordingly, if the frame rim to be measured is oblong in shape, and the initially active beam no longer illuminates the bezel from the inside of the rim, but to the contrary illuminates the outside of the rim, it is sufficient to activate the symmetrical beam which, being on the inside of the rim, will illuminate the bezel correctly. It is therefore possible in particular to provide that each of the two symmetrical beams is at a pointing angle to the optical pointing axis of approximately 70° to obtain maximum reading accuracy and efficacy.

In one preferred embodiment, combining the choice between a plurality of parallel juxtaposed light beams and a plurality of angularly offset light beams, the plurality of light beams could include a first series of at least two parallel juxtaposed light beams and a second series of at least two parallel juxtaposed light beams, the beams of the two series being symmetrical in pairs with respect to the median reading plane.

In an advantageous embodiment, each plane light beam is derived from a rectilinear coherent light beam on whose trajectory is placed a spreader lens causing the rectilinear coherent light beam to diverge in the required plane transverse to the bezel.

To be more precise, each rectilinear coherent light beam is emitted by its own laser source which is disposed vertically, parallel to the rotation axis of the read head, and an oblique mirror is disposed on the trajectory of the rectilinear coherent light beam, upstream of the spreader lens, to reorient the trajectory of the rectilinear coherent light beam, and consequently that of the divergent plane light beam derived therefrom, toward the bezel of the rim of the frame carried by the support. This vertical disposition of the laser sources considerably reduces the overall size of the read head in the radial direction, i.e. its overall size in the direction perpendicular to its rotation axis.

Similarly, to reduce the overall axial size of the read head, the optical receiver means include a matrix optical sensor and an associated objective lens both placed on a common optical axis and at least one mirror is placed obliquely to the optical axis to reorient it along a broken-line path whose final branch forms the required optical pointing axis.

For example, the optical axis is oblique to the rotation axis of the read head and at least two mirrors are placed on respective opposite sides of the axis of the read head to reorient the optical axis along a zig-zag path with at least three branches.

Finally, for rapid and convenient reading of both rims of the same frame, the read head is rotatably mounted on a carriage that can slide relative to the support for the frame between two reading positions in which the read head alternately faces one or the other of the two rims of the frame.

On the other hand, the various materials (metal, opaque or translucent plastics material, etc.) from which frames are made having very different optical properties, in particular with regard to their reflectivity characteristics, the power of the light beam can advantageously be regulated as a function of the luminous flux received by the optical receiver means to maintain that flux at a substantially constant level suited to the capabilities of the receiver means for satisfactory reading accuracy regardless of the type of frame.

Finally, for reading the shape of the outside edge of a glass template, the device advantageously includes additional support means for a template adapted to be turned relative to the read head about an axis parallel to the axis of the read head by associated drive means to move the outside edge of the template in front of the emitter means and the optical receiver means while the read head is held fixed in a particular angular position.

Other features and advantages of the invention will become apparent on reading the following description of one particular embodiment of the invention, which description is given by way of non-limiting example only and with reference to the accompanying drawings.

BRIEF DESCRIPTION OF THE DRAWINGS

FIG. 1 is an overall perspective view of an optical reading device according to the invention.

FIG. 2 is a partial perspective view of the read head on its own, with its casing represented as if it were transparent.

FIG. 3 is a partial top view of the interior of the read head on its own, with its casing represented as if it were transparent.

FIG. 4 is a partial view in axial section of the read head on its own.

DETAILED DESCRIPTION OF THE PREFERRED EMBODIMENTS

Figure 5:
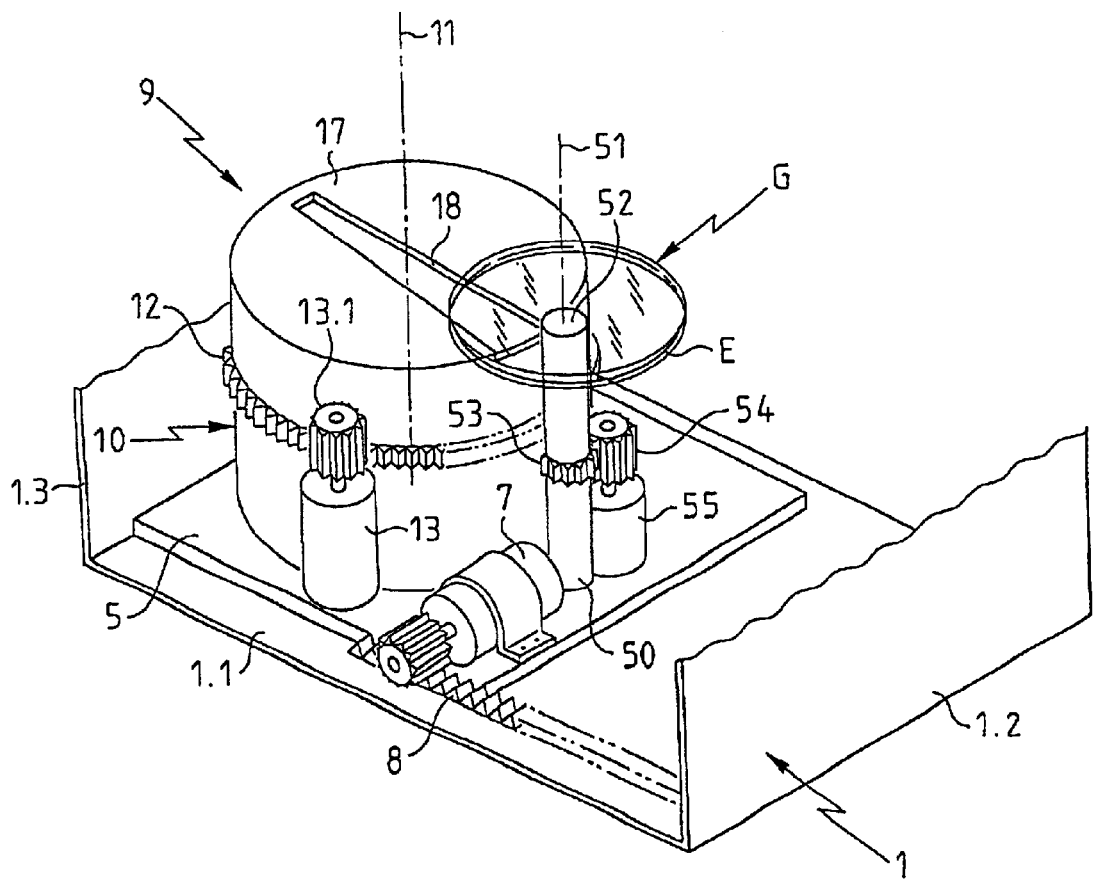
FIG. 5 is a view analogous to FIG. 1 showing a different embodiment of the device according to the invention including dedicated means for reading the outside edge of a glass template.

The non-contact optical reader device described by way of example with reference to the above figures is specifically designed for reading the three-dimensional shape of the inside edge D, referred to as the bezel, of a rim C of a spectacle frame M.

It is nevertheless clear that the essential features of the device could be transposed to other, similar applications for non-contact optical reading of any profile, in particular, although not exclusively, a closed profile.

Referring to FIGS. 1 and 2 in particular, the optical non-contact reader device according to the invention includes a chassis 1 having a generally U-shaped profile including a base 1.1 and two lateral walls 1.2, 1.3 to the top of which is attached a support 2 for a frame M. The support 2 overlies the base 1.1 and essentially comprises two jaws 3, 4 adapted to grip by their edge the two rims C of the frame M in a vertical locating plane P perpendicular to the lateral walls 1.2, 1.3.

A mobile read head 9 is mounted on the base 1.1 of the chassis 1. To be more precise, the read head 9 has a body or casing 10 of generally cylindrical shape with an axis 11, mounted on a sliding carriage 5 so that it can rotate about its axis 11, which is vertical. Rotation of the casing 10 is driven by a motor-encoder 13 whose body is fixed to the carriage 5 through a circular rack 12 at its periphery and a drive pinion 13.1. The motor-encoder 13 therefore drives rotation of the casing 10 of the read head 9 about its axis 11 and simultaneously senses its angular position about that axis relative to the carriage 5 and therefore the base 1.1.

The carriage 5 is mounted on the base 1.1 of the chassis 1 so that it can slide in a sliding direction 6 parallel to the vertical locating plane P of the frame support 2, between two reading positions in which the read head 9 is vertically aligned with one or the other of the two rims C of the frame M. For moving it in translation on the base 1.1, the carriage 5 includes a motor 7 whose body is fixed to the carriage 5 and whose shaft is fitted with a gear meshing with a rectilinear rack 8 associated with the base 1.1.

In its two reading positions, the carriage 5 abuts against the two vertical walls 1.2, 1.3 of the chassis 1, for example. Of course, other types of physical or optical, and possibly adjustable, abutment could be provided for immobilizing the carriage 5 in each of its two positions. An alternative solution would be to use a motor 7 integrating a coding function enabling it to deliver an electrical signal representative of the position of the carriage 5 so that translation of the carriage 5 with an offset corresponding to the distance between the centers of the two rims C of the frame could be controlled automatically.

The cylindrical casing 10 of the read head 9 has a cylindrical lateral wall 15 closed at respective ends by a plane bottom wall 16 and a plane top wall 17. The top wall 17 has a generally trapezoidal reading slot 18 whose function is further explained later.

Inside its cylindrical housing 10, the read head 9 includes emitter means 20, 21 adapted to project a plurality of plane light beams F1 to F8 oriented to intersect the bezel D of the rim C of the frame M transversely.

In this example the emitter means are divided into two parts 20 and 21 each adapted to emit a plurality of parallel juxtaposed light beams. To be more precise, the first part 20 of the emitter means is adapted to emit four parallel juxtaposed light beams F1 to F4 and the second part 21 of the emitter means is adapted to emit four parallel juxtaposed light beams F5 to F8.

The light beams F1 to F4 and F5 to F8 of the two series are symmetrical in pairs with respect to a median reading plane 22 containing the axis 11 of the read head 9. The beam F5 emitted by the second part 21 of the emitter means is therefore symmetrical with respect to the plane 22 to the beam F1 emitted by the first part 20 of the emitter means. Similarly, the beam F6 is symmetrical to the beam F2, the beam F7 is symmetrical to the beam F3, and the beam F8 is symmetrical to the beam F4.

FIG. 3 shows the angle a, referred to hereinafter as the pointing angle, between each of the light beams F1 to F8 and the median plane 22. Because of the parallel relationship of the beams of each series and the symmetrical relationship of the two series of beams, all the beams F1 to F8 are of course at the same angle a to the median plane 22.

To obtain good reading accuracy, as explained hereinafter, it is preferable for the pointing angle a to be greater than 45°. To be more precise, optimization calculations and experiments have shown that an optimum pointing angle for reading the bezel D accurately and effectively is around 70°, as adopted in the example shown in the figures; however, it could be from 60 to 80°.

Each plane light beam F1 to F8 is in practice derived from a rectilinear coherent light beam f1 to f8 on whose trajectory is placed a cylindrical spreader lens 25 causing the rectilinear coherent light beam f1 to f8 to diverge in the required plane transverse to the bezel D.

To be more precise, each rectilinear coherent light beam f1 to f8 is emitted by its own laser source 26 disposed parallel to the axis 11 of the read head 9, i.e. vertically. An oblique mirror 27 is placed on the trajectory of each rectilinear coherent light beam f1 to f8, upstream of the spreader lens 25, to reorient the trajectory of the rectilinear coherent light beam concerned, and consequently that of the divergent plane light beam F1 to F8 derived from it, toward the bezel D of the rim C of the frame M carried by the support 2.

In this example, each of the two parts 20 and 21 of the emitter means has a single mirror 27 in the form of an extremely elongate rectangle placed on the trajectory of the four rectilinear coherent light beams f1 to f4 and a single spreader lens in the form of an elongate cylindrical rod 25 from which the four divergent plane light beams F1 to F4 emerge. Similarly, the second part 21 of the emitter means includes a single mirror 27 and a single spreader lens 25 identical to those of the first part 20 of the emitter means.

The casing 10 of the read head 9 further contains optical receiver means including a matrix optical sensor 31, an associated objective lens 32 and two mirrors 33, 36. The sensor 31 and the associated objective lens 32 are disposed on an optical axis 34 oblique to the axis 11 of the read head 9. The mirrors 33, 36 are placed against the inside face of the cylindrical lateral wall 15 of the casing 10, one on each side of the axis 11, obliquely to the optical axis 34, to reorient the latter along a path forming a zig-zag broken line with three branches, i.e. a Z-shaped line, whose last branch forms a final optical pointing axis 35 of the receiver means situated, like the optical axis 34, in the median reading plane 22 and oriented obliquely in that plane.

To reduce overall size in the heightwise direction, i.e. along the axis 11 of the read head, in this example the optical axis 34 is at an angle to the axis 11 close to a right angle. To reduce further the overall size in this direction, the angle between the optical axis 34 and the axis 11 could be increased by placing one or more additional mirrors to obtain a zig-zag path of the optical axis with four or more branches.

The matrix optical sensor 31 can advantageously be a CMOS sensor which has the two-fold advantage over a conventional CCD sensor of being less costly and of capturing images faster.

As indicated by the double-headed arrow in FIG. 4, the optical sensor 31 can be moved along the optical axis 34 by adjustment means (not shown in the figures) for focussing the optical receiver means. The sensor 31 could instead be fixed, the optical receiver means being focussed by moving the objective lens 32 along the optical axis 34.

The optical pointing axis 35 and the general orientation of each of the light beams F1 to F8 being oblique, the plane light beams F1 to F8 and the optical pointing axis of the optical receiver means pass obliquely through the reading slot 18 in the top wall 17 of the casing 10 of the read head 9 to impinge on the bezel D of the rim C of the frame M.

The reading device finally includes a central control and computer unit (not shown in the figures) for storing and processing the reading data for each reading position of the read head 9, namely the image read by the sensor 31, the identity of the active beam F1 to F8 and the angular position of the read head 9 relative to the base 1 (and therefore relative to the frame support 2), and controls the rotation of the read head 9 and the activation of the light beams F1 to F8.

In practice, the procedure is as follows:

The frame rims C whose bezels D have to be read are placed on and fixed to the support 2 by gripping them in the manner of a vise between the jaws 3, 4 so that their central axes are approximately in the locating plane P containing the axis 11 of the read head 9. The position of the read head 9 is adjusted by moving the sliding carriage 5 so that the read head 9 is vertically aligned with one of the two rims C, with its axis 11 approximately coincident with the central axis of the rim C concerned, this configuration corresponding to the first position of the carriage 5. Reading the rim C can then begin.

The laser sources 26 are energized successively by the central control unit to activate the plane beams F1 to F8 successively until the trace of one of them on the bezel D can be read by the optical receiver means, i.e. until that trace is in the field of the optical receiver means shown by the chain-dotted lines 40 in FIGS. 3 and 4. In the configuration shown in FIG. 3, for example, it can be seen that only the symmetrical beams F2 and F6 illuminate the bezel D of the rim C within the field 40 of the optical receiver means. The other light beams either do not illuminate the frame rim C at all or illuminate it in an area that is outside the field 40 of the optical receiver means.

Consequently, if the beams F1 to F8 are activated in the order of their reference numbers, the central control unit will stop the illumination sequence at the beam F2 which is the first beam whose trace on the bezel D of the frame rim C is within the field 40 of the optical receiver means.

However, if the trace of the beam F2 on the bezel D cannot be read by the optical receiver means, or cannot be read sufficiently because of a particular optical configuration, such as one of those previously mentioned, for example assuming that the beam F2 illuminates a metal insert buried in a translucent resin from which the rim C of the frame is made, the central control unit will deactivate the beam F2 and activate the beam F6 which is symmetrical to the beam F2 to illuminate the bezel D of the frame rim C at a different angle, preventing the metal insert from interfering with the reading.

The reading of the trace of the beam on the bezel D chosen in this way is stored by the central unit which, on the basis of position parameters for the beam to be activated and the angular position of the read head 9 delivered by the motor-encoder 13, determines the three-dimensional geometrical definition of the section concerned of the bezel D using standard triangulation calculations, such as those described in the following documents:

"Applications des lasers", R. Farcy—p153–163; Masson 1993,

"A perspective, on range finding techniques for computer vision", R. A. Jarvis, IEEE transactions on pattern analysis and machine intelligence, Vol. PAMI-5, N° 2 March 1983.

The central unit then controls the motor-encoder 13 so that the read head 9 rotates about its axis 11 by a particular angular increment. In this example, the trace of the light beam initially activated can remain within the field 40 of the optical receiver means or leave it.

If the trace of the beam initially activated remains in the field 40 of the optical receiver means, the beam in question remains active and the central unit performs a new computation to determine the three-dimensional geometrical definition of the new section concerned and of the bezel D as a function of the new angular position of the read head 9.

On the other hand, if the trace of the light beam initially active leaves the field 40 of the optical receiver means, the central unit deactivates the light beam concerned and activates another light beam whose trace on the bezel D is within the field 40 of the optical receiver means. The central unit chooses the new light beam to be activated. This can be done as previously by means of a procedure for sequentially activating the beams F1 to F8 in a predetermined order until the trace of one of the beams is within the field 40 of the optical receiver means.

However, to speed up the overall reading procedure, it may be beneficial for the central unit to make this choice by detecting the direction in which the trace of the light beam initially activated progresses before leaving the field 40 of the optical receiver means, and deduce therefrom, assuming that the bezel is continuous, the adjacent light beam whose trace will most probably enter the field 40 of the optical receiver means. For example, if, subject to the hypothesis previously envisaged, the beam initially active is the beam F2 that is part of the series of beams emitted by the first part 20 of the emitter means, and if the trace of that beam F2, as seen by the optical receiver means, moves to the right in the configuration shown by way of example in FIG. 3, that signifies that the trace of that beam F2 on the bezel D is moving away from the mirror 36 of the optical receiver means. It is then necessary to activate the next light beam in the order in which the beams move farther away from the mirror 34, i.e. the beam F3 which, in conjunction with the field 40 of the optical receiver means, defines a reception range farther away than that defined by the initial beam F2.

As previously, assuming that the trace of the beam chosen in this way on the bezel D is impossible or difficult for the optical receiver means to read, for any reason of optical disturbance, such as the presence of a metal insert in the section concerned of the frame rim C, the central unit deactivates the beam chosen in this way and activates the corresponding symmetrical beam of the other series. Accordingly, under the hypothesis envisaged, the beam initially chosen for its reception range being the beam F3, on noticing the unwanted reflections the central unit will deactivate the beam F3 and, to replace it, activate the symmetrical beam F7 of the second part 21 of the emitter means.

The correct light beam having been determined in this way, the central unit stores the reading of the trace of the beam concerned delivered by the sensor 31 and deduces the three-dimensional geometrical definition of the corresponding section of the bezel D of the frame rim C from it, by computation, and as a function of the geometrical data relating to the beam activated in this way and the angular position of the read head 9 delivered by the motor-encoder 13.

On the other hand, the various materials (metal, opaque or translucent plastics material, etc.) of which frames are made having very different optical properties, in particular as to their reflectivity characteristics, the power of the light beams is regulated as a function of the luminous flux received by the optical receiver means to maintain that flux at a substantially constant level matched to the capabilities of the receiver means for satisfactory accuracy reading regardless of the type of frame.

The reading operation is repeated in this way, turning the read head 9 through the predefined angular increment each time. After one complete rotation of the read head, the central unit holds in its memory geometrical definitions of the sections of the bezel corresponding to the various angular positions of the read head 9 for which a luminous section reading has been effected.

Based on the geometrical definitions of these various sections of the bezel, the three-dimensional shape of the bezel throughout its periphery can be established using appropriate trigonometrical functions known in the art, such as those proposed in the following documents, for example:

"A perspective, on range finding techniques for computer vision", R. A. Jarvis, IEEE transactions on pattern analysis and machine intelligence, Vol. PAMI-5, N° 2 March 1983, and "System of optical non contact microtopography" M. Costa and J. Almeida, Applied Optics Vol. 32, N° 25, Sep. 1, 1993, or "Light sectioning with large depth and high resolution" G. Häusler, W. Heckel, Dec. 15, 1988, Vol. 27 N° 4, Applied Optics.

The device is calibrated using a calibrated frame to store corrections for taking manufacturing disparities into account.

The angular increment between reading positions of the read head 9 represent a compromise between, on the one hand, the accuracy of the geometrical definition of the bezel throughout its periphery, which may prove insufficient if the gap between measurement positions is too great, and on the other hand the speed of the overall reading operation, which depends directly on the number of reading positions and which is the subject of severe demands by the profession (the read head preferably having less than 10 seconds to scan the bezel). Computation and experiments indicate that a number of reading positions from 600 to 1000 is generally satisfactory. In practice, a number of reading positions approximately equal to 800 can be used, corresponding to an angular increment of approximately 0.45°.

When reading the first rim C of the frame M in this way is completed, it suffices for the central unit to control the motor 7 to slide the carriage 5 towards its second position in which the read head 9 is vertically aligned with the second rim C of the frame M, with its axis 11 approximately coincident with the central axis of the second rim C. The bezel D of the second rim C can then be read optically in the manner previously described for the first rim C.

FIG. 5 shows a different embodiment of the reading device in accordance with the invention. The device has the same main components, designated by the same reference numbers, as that previously described with reference to FIGS. 1 to 4 (chassis 1, sliding carriage 5 and read head 9), and further includes dedicated support means for reading the outside edge E of a glass template G.

The dedicated means include a support column 50 with a vertical axis 51 parallel to the axis 11 of the read head 9. The column 50 has at the top a top face 52 slightly higher than the top face 17 of the read head 9 and adapted to have the template G to be read rest on it.

The top face 52 is provided with means for fixing the template G, such as suction or sucker means for fixing the template G temporarily, in particular with the template G prevented from rotating relative to the column 50 by friction. However, any other means can be used to fix the template G to the top of the column 50, for example a simple adhesive pad.

The column 50 is adjacent the read head 9 so that when the template G is attached to its top face 52 at least a portion of the periphery of the template G is vertically aligned with the top face 17 of the read head 9.

The column 50 is mounted on the carriage 5 to turn about its axis 51. To drive it in rotation, it is provided with a toothed ring 53 that meshes with a pinion 54 associated with the shaft of a drive motor 55 whose body is fixedly mounted on the carriage 5.

The three-dimensional shape of the outside edge E of the template G carried by the column 50 in this way is read in the following manner.

The read head 9 is placed in the angular position shown in FIG. 5, in which the reading slot 18 lies substantially in the plane containing the axes 11 and 51, which in this instance corresponds to the locating plane P previously defined with reference to FIG. 1.

The read head is held in one angular position throughout the reading operation, and therefore remains fixed, in contrast to the embodiment previously described.

The outside edge E of the template G is scanned by the light beams and its luminous section is read at a series of positions along its perimeter by turning the support column 50, and therefore the template G, about the axis 51, to cause the outside edge E of the template G to move through successive angular increments in vertical alignment with the reading slot 18 of the read head 9, facing the emitter and receiver means. To this end, the central unit controls the drive motor 55 of the column 50 so that it turns the template G stepwise relative to the read head 9.

What is claimed is:

1. An optical non-contact method of reading the three-dimensional shape of a contour in accordance with the luminous section principle, said method comprising the steps of:
   providing a plurality of predefined plane light beams,
   scanning said contour at a series of positions along said contour with selected ones of the plane light beams intersecting said contour transversely and reading the trace of the selected ones of the plurality of plane light beams on said contour with an optical receiver having an optical pointing axis at a constant non-zero pointing angle to respective selected ones of the light beams, and
   determining the three-dimensional shape of said contour from readings effected at the series of positions.

2. The method claimed in claim 1, wherein said pointing angle is greater than 45°.

3. The method claimed in claim 2, wherein said pointing angle is approximately 70°.

4. The method claimed in claim 1, wherein said plurality of light beams includes at least one series of at least two substantially parallel juxtaposed light beams.

5. The method claimed in claim 4, wherein said or each series of juxtaposed light beams includes from three to eight juxtaposed light beams.

6. The method claimed in claim 1, wherein said plurality of light beams includes at least two light beams with an angle greater than 20° between them.

7. The method claimed in claim 6, wherein said plurality of light beams includes at least one pair of light beams symmetrical to each other on respective opposite sides of a median reading plane containing said optical pointing axis.

8. The method claimed in claim 7, wherein said plurality of light beams includes at least one pair of light beams symmetrical to each other on respective opposite sides of a median reading plane containing said optical pointing axis and said plurality of light beams includes a first series of at least two parallel juxtaposed light beams and a second series of at least two parallel juxtaposed light beams, the beams of said two series being symmetrical in pairs with respect to said median reading plane.

9. The method claimed in claim 8, wherein said two symmetrical series of light beams each include four parallel juxtaposed light beams.

10. The method claimed in claim 1, wherein the power of said light beams is regulated as a function of the luminous flux received by said optical receiver means to maintain said flux at a substantially constant level.

11. The method claimed in claim 1, applied to reading the shape of the inside edge, referred to as the bezel, of a rim of a spectacle frame.

12. The method claimed in claim 1, applied to reading the shape of the outside edge of a spectacle lens template.

13. A method claimed in claim 1, wherein the plurality of predefined plane light beams are activated alternately.

14. An optical non-contact device for reading the three-dimensional shape of the contour on an object, said device including a support for the object and a read head rotatable relative to said support about a rotation axis and associated with a sensor responsive to its angular position relative to said support, said read head including emitter means adapted to project a plane light beam intersecting said contour transversely and optical receiver means adapted, irrespective of the angular position of said read head relative to said support, to read the trace of said plane light beam on said contour along an optical pointing axis at a constant non-zero pointing angle to said light beam, said emitter means being adapted to project at least two separate light beams.

15. A device claimed in claim 14, wherein said object is a spectacle frame and the contour is an inside edge or bezel of a rim of the spectacle frame.

16. The device claimed in claim 15, wherein said pointing angle is greater than 45°.

17. The device claimed in claim 15, wherein said pointing angle is approximately 70°.

18. The device claimed in claim 15, wherein said plurality of light beams includes at least one series of at least two substantially parallel juxtaposed light beams.

19. The device claimed in claim 18, wherein said or each series of juxtaposed light beams includes from three to eight juxtaposed light beams.

20. The device claimed in claim 15, wherein said plurality of light beams includes at least two light beams with an angle greater than 20° between them.

21. The device claimed in claim 20, wherein said plurality of light beams includes at least one pair of light beams symmetrical to each other on respective opposite sides of a median reading plane containing said optical pointing axis of said optical receiver means.

22. The device claimed in claim 17, wherein said plurality of light beams includes at least one pair of light beams symmetrical to each other on respective opposite sides of a median reading plane containing said optical pointing axis of said optical receiver means, said plurality of light beams including a first series of at least two parallel juxtaposed light beams and a second series of at least two parallel juxtaposed light beams, said beams of said two series being symmetrical in pairs with respect to said median reading plane.

23. The device claimed in claim 22, wherein said two symmetrical series of light beams each include four parallel juxtaposed light beams.

24. The device claimed in claim 15, wherein each plane light beam is derived from a rectilinear coherent light beam on those trajectory is placed a spreader lens causing said rectilinear coherent light beam to diverge in the required plane transverse to said bezel.

25. The device claimed in claim 24, wherein each rectilinear coherent light beam is emitted by its own laser source disposed vertically, parallel to the rotation axis of said read head, and an oblique mirror is placed on the trajectory of said rectilinear coherent light beam upstream of said spreader lens to reorient the trajectory of said rectilinear coherent light beam and therefore that of said divergent plane light beam derived from it toward said bezel of said rim of said frame carried by said support.

26. The device claimed in claim 15, wherein each rectilinear coherent light beam is emitted by its own laser source disposed vertically, parallel to the rotation axis of said read head, and an oblique mirror is placed on the trajectory of said rectilinear coherent light beam upstream of said spreader lens to reorient said trajectory of said rectilinear coherent light beam and therefore that of said divergent plane light beam derived from it toward said bezel of said rim of said frame carried by said support, a single mirror and a single spreader lens in the form of a cylindrical rod being associated with each of said two symmetrical series of juxtaposed light beams.

27. The device claimed in claim 15, wherein said optical receiver means include a matrix optical sensor and an associated objective lens both placed on a common optical axis and at least one mirror is placed obliquely to said optical axis to reorient it along a path whose final branch forms the required optical pointing axis.

28. The device claimed in claim 27, wherein said optical axis is oblique to the rotation axis of said read head and at least two mirrors are placed on respective opposite sides of the axis of said read head to reorient said optical axis along a zig-zag path with at least three branches.

29. The device claimed in claim 27, wherein said matrix optical sensor and/or the associated objective lens can be moved along said optical axis by adjustment means to focus said optical receiver means.

30. The device claimed in claim 29, wherein only said matrix optical sensor is mobile along its optical axis.

31. The device claimed in claim 15, wherein the general orientation of each of said plane light beams and said optical pointing axis are oblique to the rotation axis of said read head so that, said emitter means and said optical receiver means being accommodated inside said read head, below a top wall thereof substantially perpendicular to its rotation axis, said plane light beams and said optical pointing axis pass obliquely through a reading slot in said wall.

32. The device claimed in claim 15, wherein said optical receiver means include a CMOS matrix optical sensor.

33. The device claimed in claim 15, wherein said read head is rotatably mounted on a carriage that can slide relative to said support for said frame between two reading positions in which said read head alternately faces one or the other of said two rims of said frame.

34. The device claimed in claim 15, including additional support means for a template adapted to be turned relative to said read head about an axis parallel to the axis of said read head by associated drive means to move said outside edge of said template in front of said emitter means and said optical receiver means while said read head is held fixed in a particular angular position.

35. A device claimed in claim 14, wherein said object is a spectacle lens template and the contour is an outside edge of the spectacle lens template.

* * * * *